MULTIPOLE NETWORK

Filed March 1, 1952

INVENTORS
Jacob Willem Scholten
Mattheus Johannes Fennis
By [signature]
Agent

United States Patent Office 2,768,351
Patented Oct. 23, 1956

2,768,351

MULTIPOLE NETWORK

Jacob Willem Scholten and Mattheus Johannes Fennis, Hilversum, Netherlands, assignors to Hartford National Bank and Trust Company, Hartford, Conn., as trustee Application March 1, 1952, Serial No. 274,486
Claims priority, application Netherlands March 13, 1951
8 Claims. (Cl. 333—8)

The invention relates to multipole networks for relative coupling of separate electrical channels, having frequency bandpass ranges which do not overlap, with a common channel, as used for carrier-wave telephony purposes to join a number of separate channels into one channel group or a number of channel groups into a super-group or for dividing the channel group into separate channels and so forth.

In this case such a multipole network includes a number of four pole networks. One pair of terminals of each four pole network is connected to one of the separate channels and the other pair is connected in parallel or in series and leads to the common channel. Each of these channel networks passes a definite frequency band, which is not overlapped by any of the other channels.

The impedance of each network viewed from an individual channel or from the common channel must be as constant as possible within its frequency pass-band in order to match this impedance with the impedance of the channel concerned to avoid reflection.

These four pole networks (quadripoles) are therefore often designed as Zobel filters, which are closed on the side of the common channel by an $m$-transformed half section, where $m=0.6$, in order that when viewed from the common channel the impedance (image impedance) varies as little as possible with frequency within the pass-band.

It has now been found, however, that because of the parallel or series connection of the quadripoles, the impedance matching of the various quadripoles on the side of the common channel is disturbed, since within the pass-band of the quadripole concerned the other quadripoles exhibit an imaginary impedance. Provision may therefore be made of correction networks which, for example, in the case of parallel connection of the quadripoles, consist of series circuits included in the transverse branch of the common channel, their resonant frequencies falling between the frequency ranges of the different quadripoles. Thus the multipole network becomes very complicated and costly, especially since these series circuits must be very accurately adjusted.

According to the invention the circuits connecting the channel quadripoles to the common channel each include a reactance which compensates for the reactive portion of the impedance measured between the terminals of the common channel within the bandpass of the channel quadripole. If desired, this reactance may be combined with a reactance already provided in the quadripole.

The invention is based on the recognition of the fact that by abandoning the traditional value of $m=0.6$ and by choosing a lower value of not more than 0.45 the closing sections of the quadripoles can be so designed that in the case of parallel connected quadripoles the parallel impedances of these sections and the said correction networks may be entirely dispensed with or that the correction network will include not more than two series circuits in the transverse branch of the common channel, the series resonant frequencies of which are slightly higher than the highest bandpass and lower than the lowest bandpass of the quadripoles. The chosen value of $m$ decreases as the frequency bands between the various pass-bands are enlarged. It has, for example, a value of approximately 0.1, if these frequency bands are equal to the pass-bands.

In order that the invention may be more clearly understood and readily carried into effect, it will now be described more fully with reference to the accompanying drawing.

Figure 1:
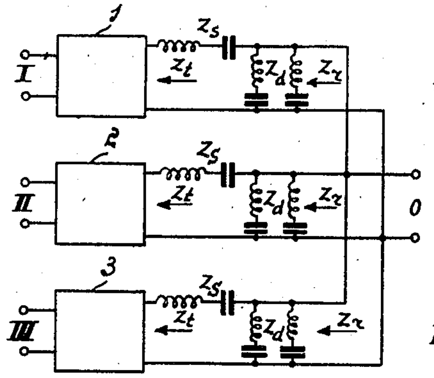
Fig. 1 shows a known multipole network.

Fig. 1 of the drawing shows a multipole network for the relative coupling of the separate electrical channels I, II, III . . . with a common channel O, including the channel quadripoles 1, 2, 3, . . . having pass-bands which do not overlap one another, the primary terminals of which are connected to the separate channels I, II, III . . . , whereas the secondary terminals are connected to the common channel O, which is coupled to a load impedance (not shown). For the sake of clearness the drawing shows only three of these separate channels.

In order to avoid impedance reflections it is common practice in a channel quadripole, constructed as a Zobel filter which is closed reflection-free at its primary, to close its secondary by means of a half-section filter in accordance with an $m$-transformation. This method is frequently used to couple the outputs of the quadripoles with a common channel O.

In this case the channel quadripole itself has an image impedance $Z_t=R\sqrt{1-y^2}$, where R is a constant with the dimensions of a resistance and $$y=\frac{f^2-f_0^2}{f(f_2-f_1)}$$

($f$ being the frequency, $f_0=\sqrt{f_1f_2}$=the central frequency of the quadripole bandpass and $f_1$ and $f_2$ being the highest and lowest frequencies of this band) whereas the $m$-transformed half-section filter comprises a reactance $Z_s$ in the longitudinal branch, having a value $Z_s=jmRy$ and a reactance $Z_d$ in the transverse branch, having a value:

$$Z_d=R\frac{1-y_2(1-m^2)}{jmy}$$

The reactance $Z_s$ can in this case be represented by a series circuit tuned to the central frequency $f_0$ and the reactance $Z_d$ by two parallel-connected series circuits having resonance frequencies lower than the lowest or higher than the highest limit frequencies of the pass-band.

It is common practice to give $m$ a value of 0.6 (vide for example Guillemin: Communication Networks, part II, 1935, page 359), where the resultant output impedance $Z_r$ of the quadripole which is not yet connected in parallel becomes approximately real and independent of frequency within the bandpass of this quadripole. However, when the quadripoles closed by the half cells $Z_s$—$Z_d$ are connected in parallel, the other quadripoles will vary this impedance $Z_r$ and thus produce an incorrect closure and hence reflections.

The relative influence of the channel quadripoles may be taken into account by provisionally omitting all the impedance $Z_d$, then calculating for each quadripole the value of the required impedance in the transverse branch, the impedance $Z_r$ of the quadripole concerned becoming substantially real and independent of frequency within the bandpass of this quadripole, when the values of the impedance $Z_r$ of the other quadripoles have been taken into account. It is then found that the transverse impedance concerned can be obtained approximately with the use of two series circuits $Z_0$ in the transverse branch of the common channel O (vide Fig. 2), of which the resonances are higher than the highest and lower than the lowest bandpass of the quadripoles.

However, this approximation is in many cases quite insufficient and could be improved by connecting additional series circuits in parallel with the series circuits $Z_0$, the resonance frequencies of these additional circuits lying in between the passages of the quadripoles.

According to the invention an appreciably simpler solution is obtainable by calculating the reactance $Z_s$ not in accordance with the aforesaid $m$-transformation with a value of $m=0.6$, but by assuming a considerably lower value of $m$, at any rate lower than 0.45, which is obtained in most cases by using a double $m$-transformation, which means that the value of the inductance of the series circuit $Z_s$ is calculated in accordance with a value of $m$ differing from that for the capacitor, so that the resonance frequency of this series circuit $Z_s$ is shifted.

According to the invention the reactances $Z_s$ can now be proportioned as follows: if the reactances $Z_s$ were completely absent, an impedance would be measured between the terminals of the common channel O, of which the real part R (vide Fig. 3) is substantially independent of frequency between the limit frequencies $f_1$ and $f_2$ of each bandpass, but of which the reactance component or imaginary part $jX$ varies substantially linearly with the frequency within these limit frequencies. Now a reactance $Z_s$ is inserted in the coupling lead between the corresponding channel quadripole and the common channel O. Impedance $Z_s$ compensates for this imaginary part. This reactance $Z_s$ then comprises a series circuit, of which the tuning frequency $f_x$ lies near the zero-passage of the line $jX$, whereas the values of the inductance and the capacity of this series circuit are determined by the inclination of the line $jX$, so that the reactance of $Z_s$ will vary substantially equally and oppositely with respect to the reflected reactance components.

Figures 3, 4:
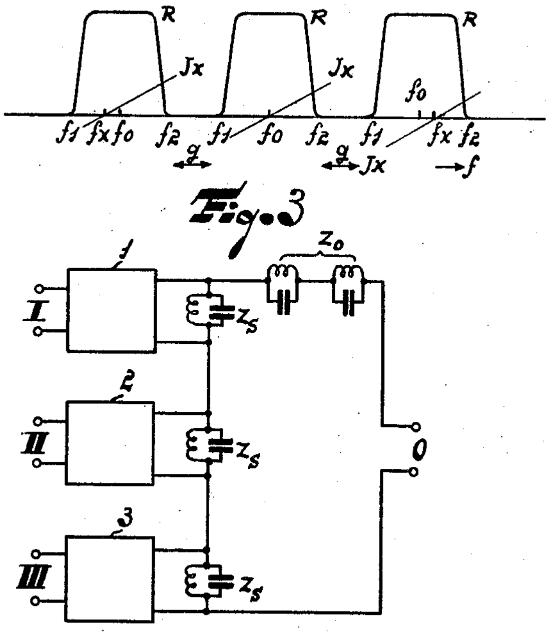
Fig. 3 shows the impedance characteristic of such a network.
Fig. 4 shows the dual transformation of the network shown in Fig. 2.

It is found in general that the resonance frequencies $f_x$ in the pass-bands for the lower frequencies are lower than the central frequency $f_0$ of the pass-band, concerned, whereas those of the bandpasses for the higher frequencies are higher than the corresponding values of $f_0$ (Fig. 3); $f_x$ and $f_0$ practically coincide for the central band. If one of the bandpasses is a low bandpass filter, it is found that all resonance frequencies $f_x$ are higher than the associated central frequencies $f_0$; if one of the bandpasses is a high-bandpass filter all resonance frequencies $f_x$ are lower than the associated central frequencies $f_0$.

In the latter case the single $m$-transformation is applied, in the other cases the double $m$-transformation, the values of $m$ being invariably lower than 0.45.

Now, if a number of reactances $Z_s$ have been included in the multipole network, the relative influence of the quadripoles will, in general, vary so that the lines $jX$ in the passages corresponding with the other quadripoles will be varied. By progressive approximation that value of the reactance $Z_s$ may finally be obtained at which, within each pass-band, the impedance R, $jX$ (Fig. 3), when viewed from the common channel, no longer has a reactive component $jX$. However, this process may be considerably shortened by providing series circuits calculated in accordance with the $m$-transformation and, if desired, detuned, having a value for $m$ which decreases as the frequency ranges $g$ between the different pass-bands are enlarged. For a number of parallel-connected channel quadripoles having pass-bands of 3.8 Kc./s., of which the passages lie between 24.1 and 27.9, 32.1 and 35.9, 30.1 and 43.9, 48.1 and 51.9, 56.1 and 59.9, 64.1 and 67.9 kc./s., the series resonance circuits $Z_s$ were calculated in accordance with the $m$-transformation with a value of $m=0.1$. At the second correction the resonance frequency of the series circuit for the passage of 24.1 to 27.9 kc./s. appeared to be lower by 3.8 kc./s. than the central frequency, that for the passage of 64.1 to 67.9 kc./s. to be higher by 7.3 kc./s. than the central frequency; for the other passages the detuning of the series circuits varied between these values.

Owing to the aforesaid correction impedances $Z_s$ it is found that the impedance $Z_0$ may be entirely dispensed with.

Figure 2:
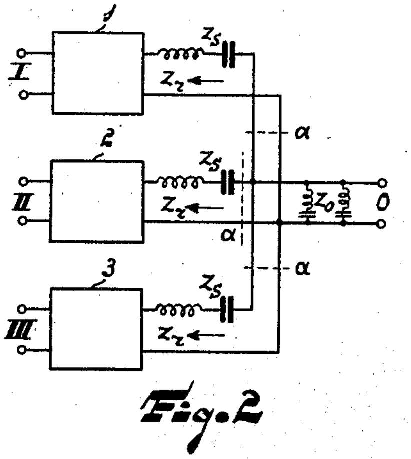
Fig. 2 shows a multipole network in accordance with the invention.

It will be obvious that a corresponding network (Fig. 4) may be obtained by dual transformation of the network shown in Fig. 2, in which the quadripoles 1, 2, 3 . . . are connected in series. Instead of finding the series circuits $Z_s$ with the $m$-transformation, corresponding parallel circuits are found, while furthermore the series circuits $Z_0$ must also be replaced by parallel circuits.

What we claim is:

1. A multipole network comprising a plurality of individual channels, each individual channel including a four pole network having output terminals and having a different band-pass characteristic at which the frequency band passed by any individual channel does not overlap the frequency band of any other individual channel, each of said frequency bands respectively comprising a center frequency, a common channel having input terminals, circuit means connecting electrically the output terminals of said channel networks to the input terminals of said common channel, the impedance reflected from said common channel appearing across the output of each network comprising a substantially pure reactance component which is equal to zero at a frequency within the frequency band of the respective channel network and which varies substantially linearly with the frequency on either side of said zero frequency within each said frequency band, a plurality of said zero frequencies being different from the center frequency of the respective frequency bands, and a plurality of reactance circuits connected respectively to the output terminals of said individual channels and individually tuned to resonance at the respective said zero frequencies within the frequency bands of the respective individual channels and having values of reactance at frequencies other than said zero frequencies which vary substantially equally and oppositely with respect to the reflected reactance components in the respective channels, whereby compensation is achieved for said reflected reactance components.

2. A multipole network as set forth in claim 1 wherein each of said individual channels includes a Zobel filter and wherein each of said reactance circuits comprises an $m$-transformed half section filter respectively connected to close said Zobel filters.

3. A multipole network as set forth in claim 2 where the value of $m$ cannot exceed 0.45.

4. A multipole network as set forth in claim 1, in which the bandwidths of said frequency bands are substantially equal to one another and substantially equal to the frequency difference between neighboring frequency bands.

5. A multipole network as set forth in claim 4, in which each of said individual channels includes a Zobel filter and in which each of said reactance circuits comprises an $m$-transformed half section filter in which the value of $m$ is approximately 0.1 and respectively connected to close said Zobel filters.

6. A multipole network as set forth in claim 1, in which said circuit means connects the output terminals of said individual channels in parallel with the input terminals of said common channel, and in which said reactance circuits comprise series-resonant circuits connected respectively in series with the output terminals of the individual channels.

7. A multipole network as set forth in claim 1, in which said circuit means connects the output terminals of said individual channels in series across the input terminals of said common channel, and in which said reactance circuits comprise parallel-resonant circuits connected respectively in parallel with the output terminals of the individual channels.

8. A multipole network as set forth in claim 1, in which said plurality of channels comprises a relatively low-frequency channel, a relatively high-frequency channel, and a relatively middle-frequency channel, and in which the reactance circuit connected to said relatively low-frequency channel is tuned to resonance at a frequency lower than the center frequency of said relatively low-frequency channel, the reactance circuit connected to said relatively high-frequency channel is tuned to resonance at a frequency higher than the center frequency of said relatively high-frequency channel, and the reactance circuit connected to said relatively middle-frequency channel is tuned to resonance at substantially the center frequency of said relatively middle-frequency channel.

References Cited in the file of this patent

UNITED STATES PATENTS

| | | |
|---|---|---|
| 1,243,066 | Hoyt | Oct. 16, 1917 |
| 1,453,980 | Hoyt | May 1, 1923 |
| 1,676,240 | Affel | July 10, 1928 |
| 2,076,248 | Norton | Apr. 6, 1937 |
| 2,167,522 | Nitz | July 25, 1939 |
| 2,249,415 | Bode | July 15, 1941 |

FOREIGN PATENTS

| | | |
|---|---|---|
| 106,733 | Australia | Mar. 9, 1939 |